(12) United States Patent
Lawless et al.

(10) Patent No.: US 10,604,437 B2
(45) Date of Patent: Mar. 31, 2020

(54) FUSED SILICA FURNACE SYSTEM AND METHOD FOR CONTINUOUS PRODUCTION OF FUSED SILICA

(71) Applicant: Navus Automation, Inc., Knoxville, TN (US)

(72) Inventors: David R. Lawless, Clinton, TN (US); Gregory J. Hayzen, Knoxville, TN (US); Charles H. Coggin, Jr., Upland, CA (US)

(73) Assignee: Navus Automation, Inc., Knoxville, TN (US)

( * ) Notice: Subject to any disclaimer, the term of this patent is extended or adjusted under 35 U.S.C. 154(b) by 141 days.

(21) Appl. No.: 14/887,599

(22) Filed: Oct. 20, 2015

(65) Prior Publication Data

US 2016/0107917 A1    Apr. 21, 2016

Related U.S. Application Data

(60) Provisional application No. 62/066,012, filed on Oct. 20, 2014.

(51) Int. Cl.
*C03B 3/00*    (2006.01)
*C03B 19/10*   (2006.01)
*C03B 3/02*    (2006.01)

(52) U.S. Cl.
CPC .......... *C03B 19/1045* (2013.01); *C03B 3/026* (2013.01)

(58) Field of Classification Search
CPC ...... C03B 19/1045; C03B 3/023; C03B 3/026
See application file for complete search history.

(56) References Cited

U.S. PATENT DOCUMENTS

| 3,109,045 | A | * | 10/1963 | Silverman | ................ C03B 3/02 373/30 |
| 3,843,340 | A |   | 10/1974 | Cone | |
| 3,964,892 | A |   | 6/1976  | Schumacher et al. | |
| 4,185,984 | A |   | 1/1980  | Kiyonaga | |
| 4,553,997 | A | * | 11/1985 | Hnat | ........................ C03B 5/12 65/134.1 |
| 4,592,770 | A |   | 6/1986  | Pearman et al. | |
| 4,631,080 | A | * | 12/1986 | Westra | ...................... C03B 3/02 65/136.1 |
| 4,752,314 | A | * | 6/1988  | Fassbender | ............... C03B 3/02 65/134.3 |

(Continued)

FOREIGN PATENT DOCUMENTS

| DE | 2844484 A1 | 4/1979 |
| JP | S5469126 U | 5/1979 |

(Continued)

OTHER PUBLICATIONS

Supplementary European Search Report for EP 15852237.5, dated Jun. 21, 2018, 10 pages.

*Primary Examiner* — John M Hoffmann
(74) *Attorney, Agent, or Firm* — Luedeka Neely Group, P.C.

(57) ABSTRACT

A method for producing fused silica including pre-heating silica sand by passing the silica sand through a gas flame, distributing the pre-heated silica sand to a furnace having an internal temperature of about 1,713° C. or greater to form molten fused silica, and cooling the molten fused silica by flowing the molten silica from the furnace into a water bath to produce fused silica particulates.

13 Claims, 4 Drawing Sheets

(56) References Cited

U.S. PATENT DOCUMENTS

| | | | |
|---|---|---|---|
| 4,904,292 A * | 2/1990 | Neusy | C03B 19/1025 65/142 |
| 4,973,346 A | 11/1990 | Kobayashi | |
| 5,243,621 A * | 9/1993 | McNeill | C03B 3/026 373/29 |
| 5,620,491 A | 4/1997 | Puhl et al. | |
| 5,672,190 A * | 9/1997 | Litka | C03B 3/026 65/134.1 |
| 5,756,957 A | 5/1998 | Titus et al. | |
| 5,928,397 A | 7/1999 | Bihuniak et al. | |
| 6,289,697 B1 | 9/2001 | Perry et al. | |
| 6,312,656 B1 | 11/2001 | Blackwell et al. | |
| 6,318,127 B1 * | 11/2001 | Illy | C03B 3/023 209/11 |
| 6,378,337 B1 | 4/2002 | Brown et al. | |
| 6,606,883 B2 | 8/2003 | Hrdina et al. | |
| 6,757,317 B2 * | 6/2004 | Kunert | C03B 5/021 373/138 |
| 6,763,682 B1 * | 7/2004 | Sayce | C03B 17/04 65/126 |
| 7,064,094 B2 | 6/2006 | Harada et al. | |
| 7,305,852 B2 * | 12/2007 | Gotoh | C03B 17/04 65/126 |
| 7,363,776 B2 | 4/2008 | Zeng et al. | |
| 8,047,023 B2 | 11/2011 | Ackerman et al. | |
| 8,196,432 B2 | 6/2012 | Jacques et al. | |
| 2002/0024161 A1 * | 2/2002 | Konya | C03B 19/1025 264/15 |
| 2002/0157420 A1 | 10/2002 | Hrdina et al. | |
| 2002/0179538 A1 * | 12/2002 | Johnson | A61K 35/19 210/723 |
| 2003/0180537 A1 * | 9/2003 | Meyer | B01D 39/06 428/404 |
| 2003/0226377 A1 * | 12/2003 | Barrett | C03B 19/01 65/17.4 |
| 2005/0039492 A1 * | 2/2005 | Romer | C03B 1/02 65/135.6 |
| 2006/0128550 A1 * | 6/2006 | Leister | C03B 5/021 501/49 |
| 2006/0144089 A1 * | 7/2006 | Eichholz | C03B 5/027 65/29.21 |
| 2007/0167307 A1 | 7/2007 | Brodie | |
| 2011/0268643 A1 | 11/2011 | Leblanc | |
| 2012/0137736 A1 * | 6/2012 | Sakamoto | C03B 3/00 65/66 |
| 2014/0000316 A1 | 1/2014 | Coggin, Jr. | |

FOREIGN PATENT DOCUMENTS

| | | |
|---|---|---|
| WO | 9903781 | 1/1999 |
| WO | 9915468 | 1/1999 |

* cited by examiner

FUSED SILICA FURNACE SYSTEM AND METHOD FOR CONTINUOUS PRODUCTION OF FUSED SILICA

CROSS-REFERENCE TO RELATED APPLICATION

This application claims priority to U.S. Provisional Application Ser. No. 62/066,012 filed Oct. 20, 2014, entitled "Fused Silica Furnace System and Method for Continuous Production of Fused Silica," the entire contents of which is incorporated herein in its entirety.

FIELD

This disclosure relates to the field of fused silica. More particularly, this disclosure relates to a system and method for producing amorphous fused silica from crystalline silica sand by continuously passing the silica sand through gas burners and a furnace to melt the silica sand, forming fused silica. The molten fused silica is then dropped in a water bath to rapidly cool and craze the molten fused silica.

BACKGROUND

Fused silica is produced by melting high-purity silica sand. The melting is typically accomplished by heating the silica sand in an electric furnace, which produces a large ingot of fused silica. During the fusion process, a hard shell forms on the outer layer of the ingot where the heat has not amorphized the crystalline silica sand.

In order to provide the fused silica in a form for commercial applications, the large ingot is removed from the furnace and cooled to ambient temperature over a period of days. After the ingot is cooled, the ingot is crushed into particulate form using large industrial crushers.

There are several problems with this batch process including requiring large amounts of electricity to melt the silica sand, significant time to cool the produced ingot, difficulty moving the large ingot through the various stages, and hazardous working conditions during the intense crushing steps.

What is needed therefore is a process for producing fused silica that will be more economical and environmentally friendly.

SUMMARY

According to one embodiment of the disclosure, a method for producing fused silica includes pre-heating silica sand by passing the silica sand through a gas flame, distributing the pre-heated silica sand to a furnace having an internal temperature of about 1,713° C. or greater to form molten fused silica, and cooling the molten fused silica by flowing the molten silica from the furnace into a water bath to produce fused silica particulates.

According to certain embodiments, the method further includes conveying the fused silica particulates from the water bath on a drying conveyor; filtering the water bath to recover fused silica particulates remaining in the water bath; and/or continuously feeding silica sand through the gas flame at an entrance flow rate that is based at least in part on an exit flow rate in which the molten fused silica exits the furnace into the water bath.

According to some embodiments, the furnace includes a temperature controlled throat valve and the exit flow rate is controlled by the temperature of the temperature controlled throat valve. According to preferred embodiments, the entrance flow rate and exit flow rate maintain a substantially constant amount of molten fused silica in the furnace.

According to another embodiment of the disclosure, a system for producing fused silica includes a silica sand source, one or more gas burners in flow communication with the silica sand source for receiving silica sand from the silica sand source and pre-heating the silica sand, a furnace in flow communication with the one or more gas burners for receiving the pre-heated silica sand, the furnace having an internal temperature of about 1,713° C. or greater to form molten fused silica, and a cooling system including a water bath in flow communication with the furnace for cooling molten fused silica received from the furnace.

According to certain embodiments, the furnace further comprises a temperature controlled throat valve for controlling an exit flow rate of the molten fused silica from the furnace to the water bath. In preferred embodiments, the temperature controlled throat valve is formed at least in part from molybdenum.

According to certain embodiments, the furnace further includes an upper dome formed from a high temperature refractory material, a kettle disposed below the upper dome having an inner high temperature refractory layer and a water cooled outer layer, and a hot region disposed between the upper dome and the inner high temperature refractory layer of the kettle for maintaining the molten fused silica in a molten state.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

The present disclosure provides a system and process for producing amorphous fused silica from crystalline silica sand by continuously passing the silica sand through gas burners to melt the silica sand, forming molten fused silica, and then dropping the molten material in a water bath to rapidly cool and craze the fused silica. As described below, the key components of the system are (1) a furnace having one or more gas burners for pre-heating the silica sand and raising the temperature of the furnace for thoroughly melting the silica sand; and (2) a cooling system including a water bath for quickly lowering the temperature of the molten silica exiting the furnace.

Figure 1:
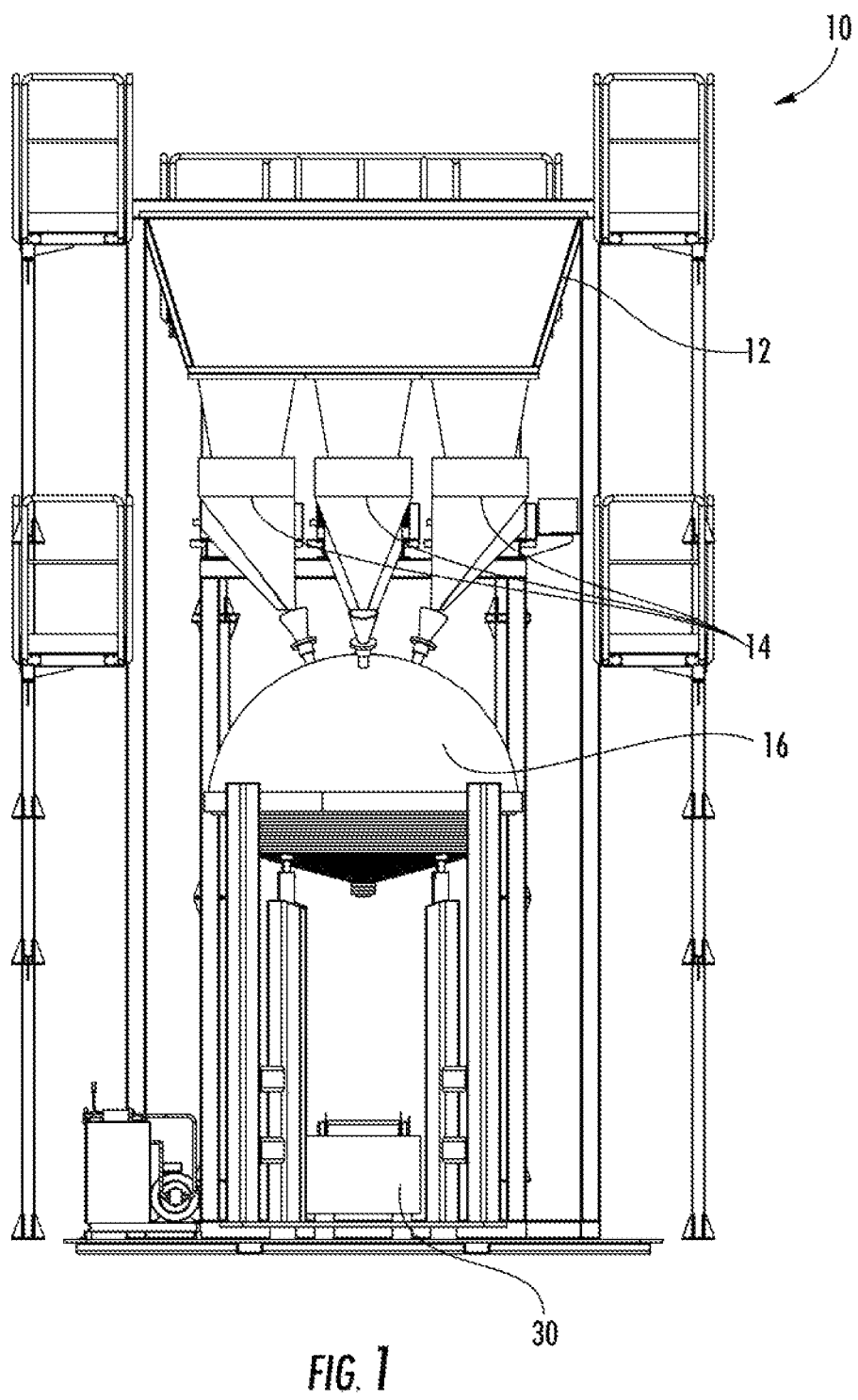
FIG. 1 is a side schematic view of an apparatus for producing amorphous fused silica from crystalline silica sand according to one embodiment of the disclosure.
Figure 2:
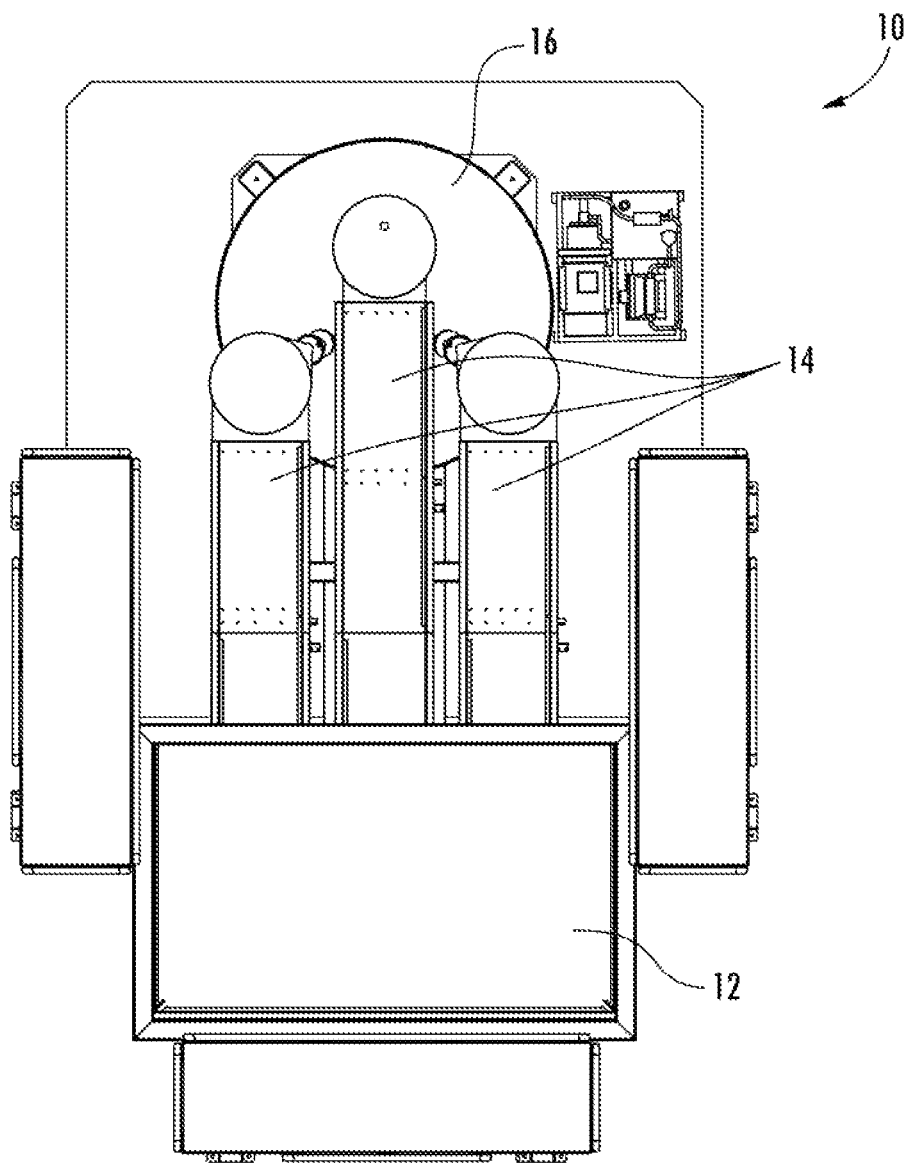
FIG. 2 is an overhead schematic view of an apparatus for producing amorphous fused silica from crystalline silica sand according to one embodiment of the disclosure
Figure 3:
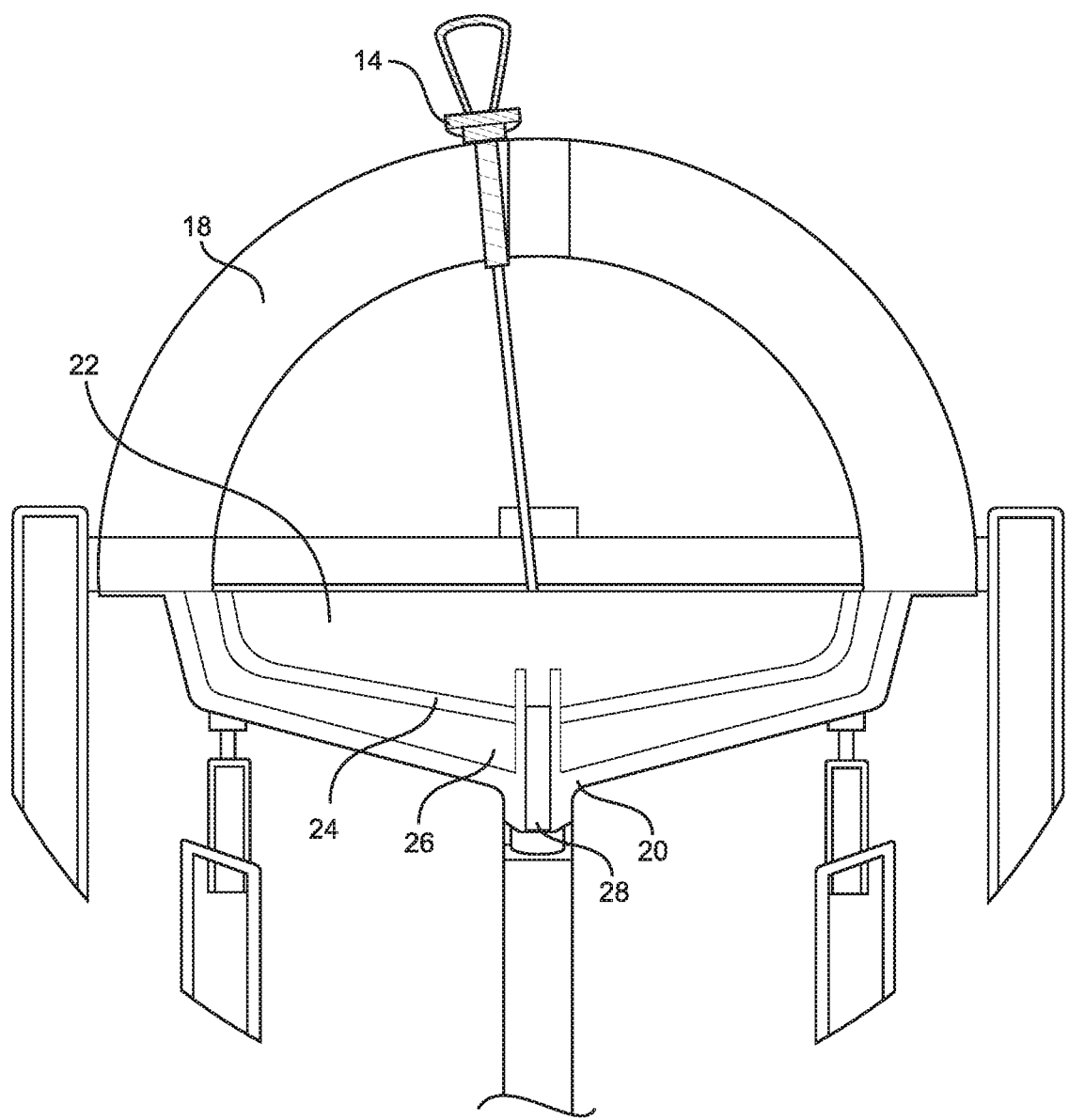
FIG. 3 is a cross sectional view of a furnace for producing amorphous fused silica from crystalline silica sand according to one embodiment of the disclosure.

With reference to FIGS. 1-3, the system 10 preferably includes a silica sand source 12 that distributes silica sand through one or more gas burners 14 to a furnace 16. Thus, there is a dual purpose of the burners 14 in that they preheat/melt the silica sand as it is being transferred into the furnace, while at the same time maintaining a sufficiently high enough temperature in the furnace for the silica to form fused silica and to remain molten.

As shown in FIG. 1, the system 10 preferably includes three gas burners 14 mounted to the top of the furnace/melter 16. In operation, the silica sand is distributed directly through the preferably natural gas and oxygen flame of the gas burners 14 at a controlled rate and is then deposited into the furnace 16 chamber. The burners 14 also raise the internal temperature of the furnace chamber to temperatures at or above the melting point of the silica sand, which is about 1,713° C.

Referring to FIG. 3, the furnace 16 preferably includes an upper dome 18. As shown, the burners 14 pass through the upper dome 18. In preferred embodiments, the burners 14 are mounted in custom shaped refractory blocks in the upper dome 18 of the furnace 16 such that the burners 14 can be easily changed for repair without stopping the furnace 16. The "dome" shape was chosen to form the strongest structure as well as provide the least amount of surface area for heat losses. Dome 18 is preferably formed from fused silica refractory material, or other high temperature refractory materials, such that the furnace can operate without melting. In certain embodiments, an insulating layer may be added to the outside of the upper dome 18 to reduce energy losses.

The furnace 16 further includes a kettle 20 disposed below the upper dome 18. Together, the kettle 20 and upper dome 18 form the furnace chamber for receiving the molten silica from the gas burners 14. In preferred embodiments, the kettle 20 includes a water-cooled steel shell having an inner silica refractory layer 26. As noted above, the silica sand becomes molten while passing through the very hot zone of the oxy-gas flames of burners 14. The molten silica is distributed from the burners 14 to the kettle 20 of furnace 16 where it forms a molten fused silica pool 22 of low viscosity silica directly under the burners 14. The pool 22 of very hot and low viscosity silica under the flames increases in viscosity near the water-cooled outer shell 20 as represented by the higher viscosity silica layer 24. In effect, the higher viscosity silica 24 becomes the non-contaminating refractory layer 26 for the furnace 16 adjacent the water-cooled steel kettle shell 20.

Accordingly, the combination of silica refractory material of furnace 16 and dome-mounted burners 14 create a hot region 22 of molten silica at the flame impact zone. The thermal energy introduced by the burners 14 at the flame impact zone is then transmitted by radiation and conduction through the lower viscosity silica regions to the refractory layer 26 resulting in molten, low viscosity silica 22 at the flame impact zone and high viscosity silica 24 near the refractory layer 26. While the thermal energy from the burners 14 is removed by the water flowing through the water-cooled steel shell, the opaque refractory layer 26 serves to block the thermal radiation from easily passing through the clear silica, increasing the efficiency of the water-cooled shell and minimizing heat losses.

The furnace 16 also includes a throat 28 forming an outlet tube where the molten fused silica continuously exits the furnace in a controlled fashion to a water bath 30 for rapid cooling and crazing. In preferred embodiments, the throat 28 is constructed from molybdenum and is heated to prevent the molten silica from becoming too cool to flow. In preferred embodiments, the exit flow rate of the molten fused silica from the furnace 16 is controlled by controlling the temperature of the heated throat 28. In this regard, increasing the temperature of the throat 28 increases the exit flow rate by lowering the viscosity of the molten fused silica while decreasing the temperature of the throat decreases the exit flow rate by increasing the viscosity of the molten fused silica. Further, the weight of the furnace 16 is maintained constant by varying the feed rate of the silica sand into the gas burners 14 based on the amount of molten fused silica exiting through the molybdenum throat valve 28.

In another aspect of the disclosure, after the molten fused silica solidifies and is crazed in the water bath 30, pieces of fused silica are preferably transferred from the water bath to a drying conveyor. The water bath 30 also preferably includes a filtration system to reclaim fused silica too small to be extracted from the water bath 30 by the drying conveyor. Thus, the purpose of the filtration system is to increase longevity of the conveyor system and reduce waste of good fused silica product.

In another aspect of the disclosure, a furnace cooling system is provided to supply coolant water to the kettle 20. In this regard, the cooling system generally includes a closed loop heat exchanger having cooling coils incorporated into the bottom half of the furnace 16 (i.e., steel kettle shell 20). It is noted that the circulation water and coolant are kept separate and evaporation coolers may be installed outside to save space in the factory building.

In yet another aspect of the disclosure, the furnace 16 may include a waste heat recovery system that captures the furnace's exhaust air and reuses at least some of the energy from the heated air to dry the fused silica on the drying conveyor. It is noted that only a fraction of waste heat from the furnace 16 will likely be needed for drying the fused silica on the drying conveyor. However, more waste heat could be recovered and utilized for general power generation, heating the factory building, material preheating, etc.

Figure 4:
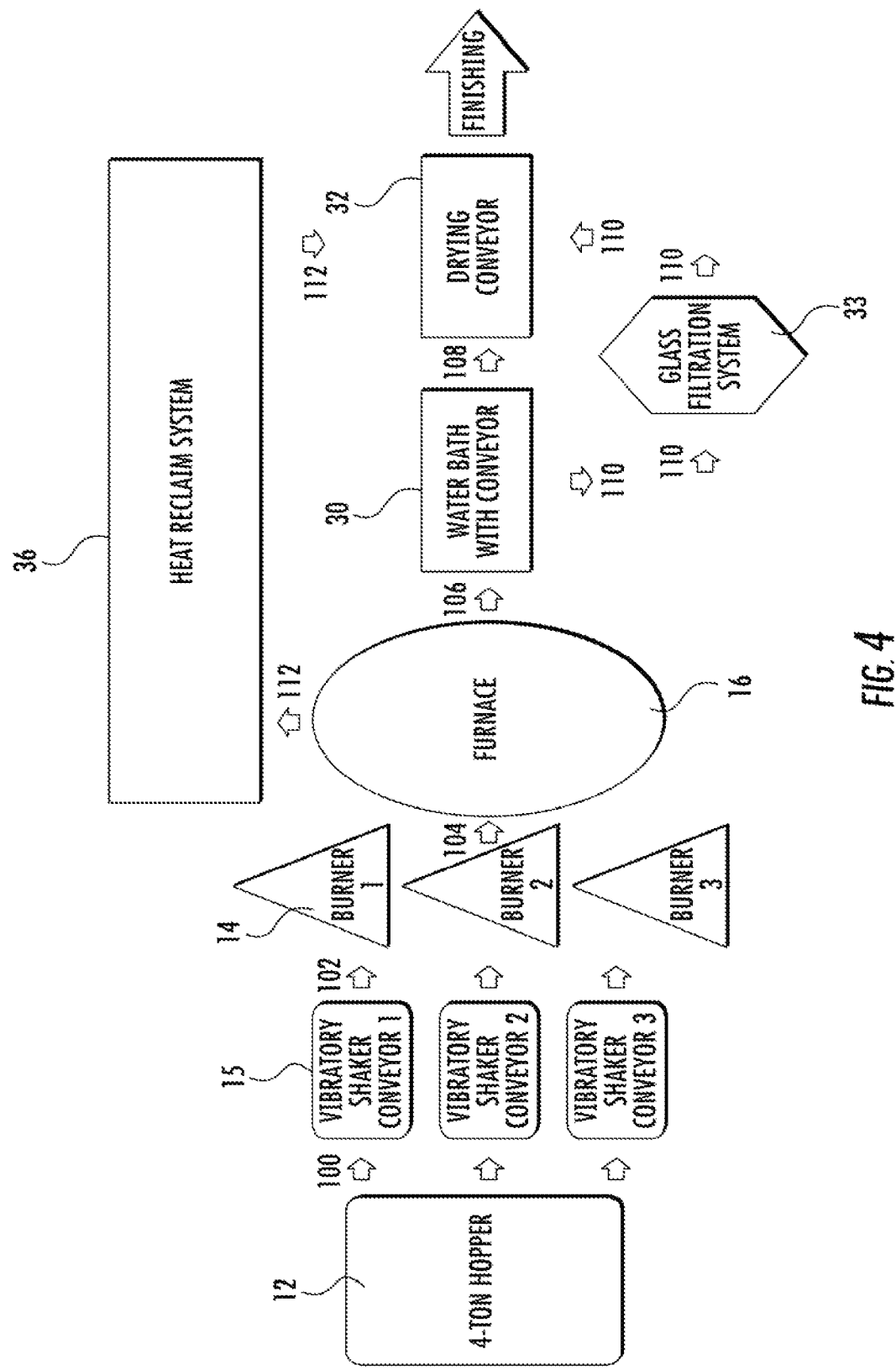
FIG. 4 is a flow chart for producing amorphous fused silica from crystalline silica sand according to one embodiment of the disclosure.

Referring to the block diagram of FIG. 4, a preferred process for producing fused silica according to the present disclosure is shown. In step 100, silica sand is distributed from container 12 onto a transfer conveyor 15. The transfer conveyor dispenses the silica sand into gas burners 14 at a controlled rate in step 102. In step 104, the silica sand travels through the gas burners 14, directly exposing the silica sand to a gas flame of the gas burners 14 to pre-heat/melt the silica sand and distribute the molten silica into the furnace 16 as needed for production of fused silica. The furnace 16 preferably maintains about 2000 pounds of molten silica at about 1750° C. In step 106, the molten fused silica exits through the molybdenum into the water bath 30 where it solidifies and crazes as a result of being immersed in the water bath 30. In step 108, particulate fused silica is transferred away from the water bath 30 on a drying conveyor 32. In step 110, the water bath 30 goes through a filtration system 33 to recover smaller fused silica particulates, which are then transferred to the drying conveyor. Finally, step 112 depicts waste heat from the furnace 16 being recycled in the waste heat recovery system and used with the drying conveyor 32.

Key benefits to the proposed system as compared to traditional bulk and electric heat process for producing fused silica includes the following:

1. Safety—The system reduces and/or eliminates: overhead loads, flying glass, high voltage, large vehicles, high pressure wands, hot sand, etc.

2. Lower energy costs from oxygen and natural gas combustion compared to electricity and consumable graphite electrodes.

3. Constant operation improves thermal efficiency of the furnaces.

4. Burners allow constant feeding of raw material silica sand directly through high temperature flames.

5. Controlled removal of molten amorphous silica through an electrically heated molybdenum throat.

6. The molten, amorphous silica falls into a water bath for rapid cooling and crazing. This eliminates the work-in-process as a result of cooling, as well as eliminating other hazardous processes.

7. Major reduction in post processing of product; does not require crushing of multi-ton fused silica ingot.

8. Reduces overall waste and environmental concerns, such as the ingot peel and airborne silica dust.

9. Significantly reduces labor requirements.

10. Drastic reduction in maintenance costs.

11. Eliminates the use of large mobile equipment, such as cranes, fork trucks and kiln sled systems used to move the large ingot.

It should also be understood that the present system could be used to form a wide range of other materials. It is particularly well-suited as a continuous process to produce materials similar to fused silica that require the feed material to be melted at high temperatures including, but not limited to, fused zirconia, alumina, and magnesia.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

The invention claimed is:

1. A method for producing amorphous fused silica, the method comprising:
    providing a furnace having
        a furnace chamber with an upper dome,
        one or more gas burners mounted to and passing through said upper dome, and
        a furnace outlet,
        the one or more gas burners raising an internal temperature of the furnace chamber to about 1,713° C. or greater and then maintaining the internal temperature of the furnace chamber at about 1,713° C. or greater;
    heating crystalline silica sand by passing the crystalline silica sand through the one or more gas burners wherein at least a portion of the heated crystalline silica sand is melted to form molten fused silica;
    depositing the heated crystalline silica sand that has passed through the one or more gas burners and the molten fused silica into the furnace chamber;
    forming a pool of molten fused silica in the furnace chamber; and
    flowing molten fused silica from the pool of molten fused silica through the furnace outlet and into a water bath to produce amorphous fused silica particulates.

2. The method of claim 1 further comprising conveying the fused silica particulates from the water bath on a drying conveyor.

3. The method of claim 2 further comprising filtering the water bath to recover fused silica particulates remaining in the water bath.

4. The method of claim 1 further comprising continuously feeding crystalline silica sand through the gas flames at an entrance flow rate that is based at least in part on an exit flow rate in which the molten fused silica exits the furnace outlet into the water bath.

5. The method of claim 4 wherein the furnace outlet includes a temperature controlled throat valve, the method further comprising controlling the exit flow rate by controlling a temperature of the temperature controlled throat valve.

6. The method of claim 4 wherein the entrance flow rate and exit flow rate maintain a substantially constant amount of molten fused silica in the furnace.

7. The method of claim 1 further comprising forming a high viscosity silica layer below the pool of molten fused silica, the high viscosity silica layer having a viscosity greater than a viscosity of the molten fused silica of the pool of molten fused silica.

8. The method of claim 7 wherein the furnace includes means for cooling an outer shell of the furnace, the high viscosity silica layer disposed between the cooled outer shell and the pool of molten fused silica.

9. A method for producing amorphous fused silica, the method comprising:
    providing a furnace having a furnace chamber having an upper dome, a cooled outer shell, one or more gas burners mounted to and passing through said upper dome, and a furnace outlet, the one or more gas burners raising an internal temperature of the furnace chamber to about 1,713° C. or greater and then maintaining the internal temperature of the furnace chamber at about 1,713° C. or greater;
    passing crystalline silica sand through the gas flames of the one or more gas burners to form a pool of low viscosity fused silica in the furnace chamber;
    forming a high viscosity silica layer below the pool of low viscosity fused silica and adjacent to the cooled outer shell of the furnace chamber, the low viscosity silica layer having a viscosity lower than a viscosity of the high viscosity silica layer; and
    flowing the low viscosity fused silica through the furnace outlet and into a water bath to produce amorphous fused silica particulates.

10. The method of claim 9 further comprising continuously feeding crystalline silica sand through the gas flames at an entrance flow rate that is based at least in part on an exit flow rate in which the low viscosity fused silica exits the furnace outlet into the water bath.

11. The method of claim 10 wherein the furnace outlet includes a temperature controlled throat valve, the method further comprising controlling the exit flow rate by controlling a temperature of the temperature controlled throat valve.

12. The method of claim 11 wherein the entrance flow rate and exit flow rate maintain a substantially constant amount of molten fused silica in the furnace.

13. The method of claim 9 wherein the step of passing the crystalline silica sand through the gas flames of the one or more gas burners forms molten fused silica.

* * * * *